No. 712,348. Patented Oct. 28, 1902.
W. P. WILLETT.
TRAP NEST.
(Application filed June 28, 1902.)
(No Model.)
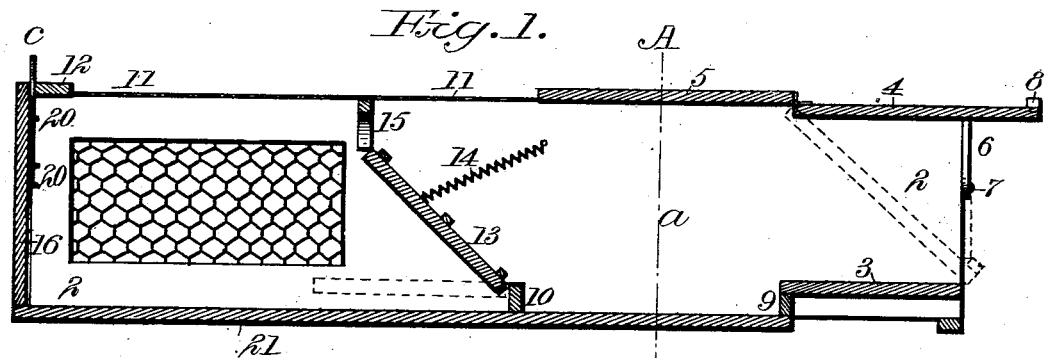
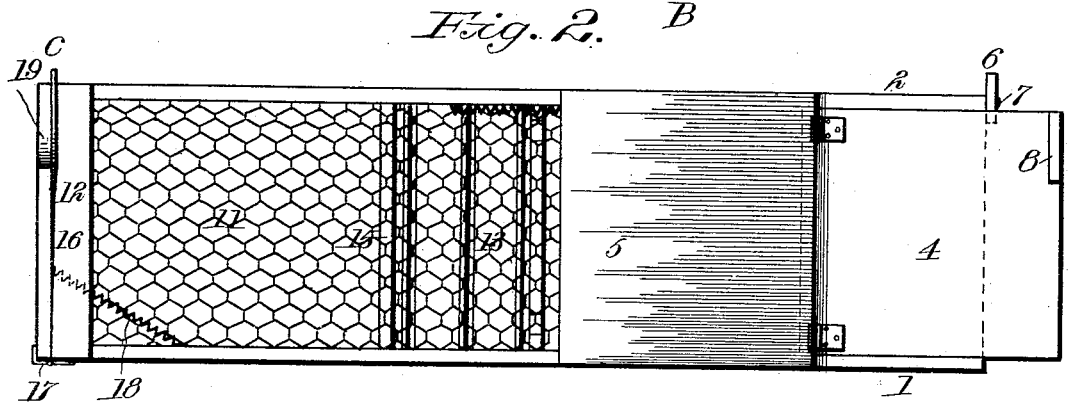
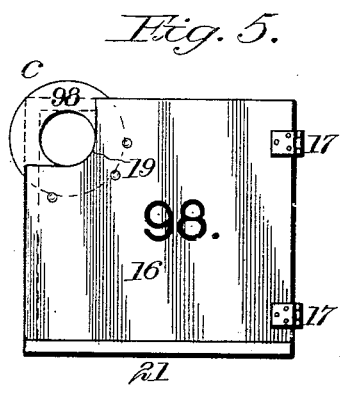
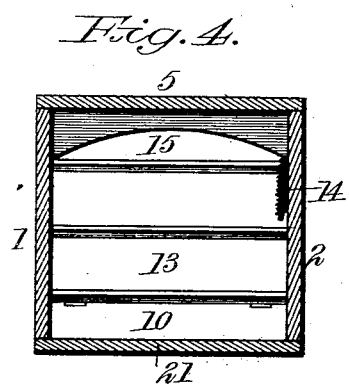
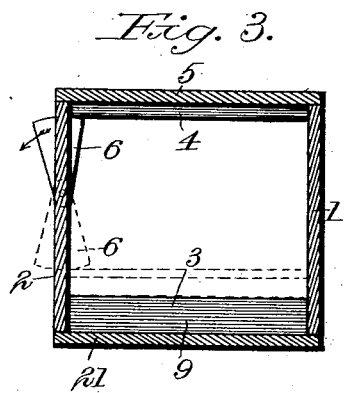
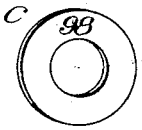
Witnesses
C. H. Walker
E. Thos. Loftus
Inventor
Wallace P. Willett
By
Attorney
THE NORRIS PETERS CO., PHOTO-LITHO., WASHINGTON, D. C.

UNITED STATES PATENT OFFICE.

WALLACE P. WILLETT, OF EAST ORANGE, NEW JERSEY.

TRAP-NEST.

SPECIFICATION forming part of Letters Patent No. 712,348, dated October 28, 1902.

Application filed June 28, 1902. Serial No. 113,654. (No model.)

*To all whom it may concern:*

Be it known that I, WALLACE P. WILLETT, a citizen of the United States of America, and a resident of East Orange, in the State of New Jersey, have invented a new and useful Improvement in Trap-Nests, of which the following is a specification.

This invention relates to the construction of those nest-boxes for henneries known as "trap-nests," in which provision is usually made for temporarily confining the hen after an egg is laid with reference to identifying the eggs of particular strains and ascertaining the number of eggs laid by each hen.

One object of my present invention is to provide an easy and inviting entrance to the box and at the same time to provide for automatically closing and locking the entrance behind the hen.

Another object is to avoid any detention of the hen after she has laid her egg and at the same time to insure the identification of each hen and each egg.

The invention consists in certain novel combinations of parts hereinafter set forth and claimed.

A sheet of drawings accompanies this specification as part thereof.

Figure 1 of the drawings represents a vertical longitudinal section of the improved trap-nest. Fig. 2 is a top view projected from Fig. 1. Figs. 3 and 4 represent cross-sections on the line A B, Fig. 1, looking, respectively, toward the entrance and toward the customary middle door. Fig. 5 is an elevation of the exit end with an identifying ring in position, and Fig. 6 is a perspective view of the identifying-ring detached.

Like letters and numbers refer to like parts in all the figures.

The external shape and framework of the improved nest may be and preferably are generally similar to those shown in my drawings forming part of Patent No. 649,149, dated May 8, 1900. Such framework comprises longitudinal side walls 1 and 2, common to all.

The entrance (shown at the right in Figs. 1 and 2 and by Fig. 3) is formed between said side walls by a fixed vestibule-floor 3 and a hinged door 4, the latter parallel or substantially parallel to said vestibule-floor when open, as in full lines in Fig. 1, and hinged at its inner edge to the fixed top 5 of the nest-compartment *a*.

The entrance-door 4 is kept open for the admission of the hen by a self-reversing detent 6, loosely pivoted at one end to the front end of one side wall 2 by a horizontal screw 7 and having its other end widened, so as to project on both sides of the side wall in its respective positions.

The open door 4 is low enough with reference to the vestibule-floor 3 to render it certain that when a hen is upon this floor her back will slightly lift the door. The detent 6, thus freed from the weight of the door, drops into the reversed position in which it is shown by dotted lines in Figs. 1 and 3. The door 4 then gently falls behind the hen, the detent 6 swings above it, as in dotted lines in these figures, and a cleat 8 on the door interlocks with the detent 6 to keep the door 4 from being reopened from within. A comfortable nest having been provided within said nest-compartment *a* between cross-pieces 9 and 10, the hen readily avails herself of the place to lay her egg before attempting to escape. Said fixed cover 5 of said nest-compartment *a* extends rearwardly above the nest. From its rear edge wire-netting 11 or the like extends to a cross-piece 12 at the rear end of the side walls. A middle door 13 is formed, as in my said patented nest-box, by a cleated board hinged to the rear cross-piece 10 of the nest-compartment and normally supported in an inclined position by a light spiral spring 14, so as to lead upwardly toward the covering 11, of wire-netting or the like. A stop-piece 15 above it is notched, as in Fig. 4, to prevent injury to the hen should she retreat after thrusting her neck into the second compartment *b*. Ordinarily, as the hen starts to climb the middle door 13 sinks at once to the horizontal position in which it is shown in dotted lines in Fig. 1 and the hen passes into said second compartment *b*. This compartment has heretofore been essential for detention purposes. It is no longer essential, but is considered desirable to provide for detaining the hens at will.

The exit-door 16 is attached to one of the side walls by hinges 17 and is normally held shut by a light spiral spring 18, Fig. 2, the resistance of which can readily be overcome by a hen. A notch 19, Fig. 5, at the upper corner of the free edge of the exit-door invites the hen to protrude her head and neck in seeking liberty. Supports 20, Fig. 1, on the inner side of the door adjacent to said notch 19 are conveniently formed by the upturned points of nails driven through the door. Upon these supports 20 I loosely place an identifying-ring c, of stiff paper or sheet metal, provided with a number or other mark corresponding with the number or name of the nest, the opening of the ring coinciding with the notch 19. The hen, following her well-known inclination, is thus led to thrust her head through the ring and at the same time to open the exit-door herself. The ring catches behind the feathers of the neck and is carried by the hen until she goes to roost. The attendant then removes the ring and notes its number or mark and the number on the customary leg-band of the hen. From the data thus obtained a complete record may be kept of each hen and of the eggs taken from each nest without depriving the hens of liberty and with the least possible work on the part of the attendants.

The exit-door 16 is closed behind the escaping hen by its spring 18, and entrance to the nest-box at either end is then impossible until it is reset by the attendant.

If it be desired to catch a hen in the nest-box, the exit-door 16 may be temporarily fastened by means of a hook or the like to detain the hen in the second compartment b, but ordinarily the hen is allowed to escape at once, and the middle door 13, with its appurtenances, and the second compartment b may be wholly dispensed with without affecting either of the novel features of the improved trap-nest.

The nest-box may be made with or without a bottom 21, and other like modifications will suggest themselves to those skilled in the art.

Having thus described said improvement, I claim as my invention and desire to patent under this specification—

1. An improved trap-nest for henneries having, in combination, a covered nest-compartment, a vestibule with side walls leading thereto, a gravitating inlet-door hinged at its inner edge and arranged to be disturbed by the back of the hen in her entrance through said vestibule, and a self-reversing detent pivotally attached to the outer end of one of said side walls and adapted to support said inlet-door in its horizontal or substantially horizontal open position until relieved of the weight of the door and in its reversed position to keep the door from being reopened from within.

2. An improved trap-nest for henneries having, in combination, a covered nest-compartment, a vestibule with side walls and floor leading thereto, a gravitating inlet-door hinged at its inner edge and arranged to be disturbed by the back of the hen in her entrance through said vestibule, and a self-reversing detent pivotally attached to the outer end of one of said side walls and adapted to support said inlet-door in its horizontal or substantially horizontal open position until relieved of the weight of the door and in its reversed position to keep the door from being reopened from within.

3. An improved trap-nest for henneries having, in combination, a covered nest-compartment, a vestibule with side walls leading thereto, a gravitating inlet-door hinged at its inner edge, provided at its outer edge with a fastening-cleat and arranged to be disturbed by the back of the hen in her entrance through said vestibule, and a self-reversing detent pivotally attached to the outer end of one of said side walls and adapted to support said inlet-door in its horizontal or substantially horizontal open position until relieved of the weight of the door and to interlock with said cleat when the door is closed.

4. An improved trap-nest for henneries having an exit-door hinged at one lateral edge, provided at the upper corner of its opposite edge with a notch through which a hen may protrude her head, and provided on its inner side adjacent to said notch with supports for an identifying-ring of stiff paper or the like, thereby alined with said notch, and loosely held between the door and the end of the nest-box.

5. An improved trap-nest for henneries having a spring-closed exit-door hinged at one lateral edge, provided at the upper corner of its opposite edge with a notch through which a hen may protrude her head, and provided on its inner side adjacent to said notch with supports for an identifying-ring of stiff paper or the like, thereby alined with said notch, and loosely held between the door and the end of the nest-box.

6. An improved trap-nest for henneries having a covered nest-compartment, a vestibule leading thereto, means for automatically closing said vestibule behind the hen, and a self-closing exit-door hinged at one lateral edge, provided at the upper corner of its opposite edge with a notch through which a hen may protrude her head, and provided on its inner side adjacent to said notch with supports for an identifying-ring of stiff paper or the like, thereby alined with said notch, and loosely held between the door and the end of the nest-box, substantially as hereinbefore specified.

WALLACE P. WILLETT.

Witnesses:
LEWIS N. THORNE,
MONTGOMERY LINDSAY.